United States Patent
Vasamsetti et al.

(10) Patent No.: US 8,355,413 B2
(45) Date of Patent: Jan. 15, 2013

(54) POLICY BASED PROCEDURE TO MODIFY OR CHANGE GRANTED QOS IN REAL TIME FOR CDMA WIRELESS NETWORKS

(75) Inventors: Satya Narayana (Satish) Vasamsetti, Danville, CA (US); Kuntal Chowdhury, Plano, TX (US)

(73) Assignee: Cellco Partnership, Basking Ridge, NJ (US)

( * ) Notice: Subject to any disclaimer, the term of this patent is extended or adjusted under 35 U.S.C. 154(b) by 813 days.

(21) Appl. No.: 11/356,212

(22) Filed: Feb. 17, 2006

(65) Prior Publication Data

US 2007/0195788 A1 Aug. 23, 2007

(51) Int. Cl.
- H04L 12/28 (2006.01)
- H04L 12/56 (2006.01)
- H04J 3/16 (2006.01)
- H04J 3/22 (2006.01)
- G06F 15/173 (2006.01)
- H04W 72/00 (2009.01)

(52) U.S. Cl. ............ 370/468; 370/389; 370/395.2; 370/395.21; 370/465; 455/452.1; 455/452.2; 709/238; 709/240

(58) Field of Classification Search ............ 370/230.1, 370/395.21, 389, 395.2, 465, 468; 455/452.1, 455/452.2; 709/238, 240
See application file for complete search history.

(56) References Cited

U.S. PATENT DOCUMENTS

| | | | |
|---|---|---|---|
| 6,577,644 B1 | 6/2003 | Chuah et al. | |
| 6,728,365 B1 | 4/2004 | Li et al. | |
| 6,765,909 B1 | 7/2004 | Sen et al. | |
| 6,799,039 B2 * | 9/2004 | Wu et al. | 455/436 |
| 6,925,057 B2 | 8/2005 | Cheng et al. | |
| 6,940,836 B2 | 9/2005 | Borella et al. | |
| 6,980,523 B1 | 12/2005 | Lipford et al. | |
| 7,418,596 B1 * | 8/2008 | Carroll et al. | 713/169 |
| 2002/0112060 A1 * | 8/2002 | Kato | 709/227 |
| 2003/0204596 A1 * | 10/2003 | Yadav | 709/226 |
| 2004/0008632 A1 | 1/2004 | Hsu et al. | |
| 2004/0085922 A1 | 5/2004 | Herle | |
| 2004/0102182 A1 | 5/2004 | Reith et al. | |
| 2004/0180677 A1 * | 9/2004 | Harris et al. | 455/466 |
| 2004/0228304 A1 | 11/2004 | Riedel et al. | |
| 2005/0047337 A1 * | 3/2005 | Virtanen | 370/229 |
| 2005/0089043 A1 * | 4/2005 | Seckin et al. | 370/395.21 |

(Continued)

OTHER PUBLICATIONS

International Search Report and Written Opinion of the International Searching Authority issued in International Patent Application No. PcT/US07/00822, dated on Oct. 16, 2007.

*Primary Examiner* — Ayaz Sheikh
*Assistant Examiner* — Tarell Hampton

(57) ABSTRACT

A policy based look up procedure enables a code division multiple access (CDMA) wireless network to modify a quality of service (QoS) level granted for an application packet flow in real time, e.g. in response to a customer service request, upon determination of a need to change network operations, periodically, or under other dynamic circumstances. The policy look up table identifies QoS levels and rules to identify an individual or group of users or types of applications and the associated packet flows that should be processed through a radio access network in accord with each applicable QoS level. In a typical implementation, a packet data serving node stores or has access to the carrier's QoS policy table to perform the look up and instruct a radio network controller or other element of the radio access network as to the applicable QoS level for each packet flow for a mobile station.

14 Claims, 5 Drawing Sheets

U.S. PATENT DOCUMENTS

| | | | |
|---|---|---|---|
| 2005/0243755 A1* | 11/2005 | Stephens | 370/328 |
| 2006/0007936 A1* | 1/2006 | Shrum et al. | 370/395.21 |
| 2006/0176907 A1* | 8/2006 | Takeda | 370/468 |
| 2007/0047527 A1* | 3/2007 | Croak et al. | 370/356 |

* cited by examiner

POLICY BASED PROCEDURE TO MODIFY OR CHANGE GRANTED QOS IN REAL TIME FOR CDMA WIRELESS NETWORKS

TECHNICAL FIELD

The present subject matter relates to techniques and equipment for adding a policy based procedure to modify or change in real time a level of QoS from that normally granted to a packet flow, for packet-based communications via a wireless network.

BACKGROUND

In recent years, mobile wireless communications have become increasingly popular. Initial implementations of mobile wireless communications, for example in the form of cellular telephone networks, supported circuit switched voice communication services. As mobile communication via public wireless networks has become increasingly popular, the wireless networks have been upgraded to offer wireless mobility for packet data communications. For example, a wide variety of voice and multimedia services are now being deployed in 3G cdma2000 type public wireless networks using Internet Protocol (IP) connectivity.

Initial deployments providing wireless packet communications offered only 'best efforts' delivery service. Such a packet routing service does not provide any guaranteed level of quality of service (QoS). Although such a delivery may be quite adequate for many applications, such as text messaging or web page delivery, other applications like real-time video delivery are sensitive to delays and/or jitter and require packet delivery with QoS guarantees.

Wireless service providers are enhancing their networks to offer QoS guarantees, e.g. to support new multimedia service applications. The current QoS standards for wireless networks will provide any application running in the mobile device an ability to request for a certain class or level of QoS from the radio network devices. Based on the available resources and the user profile information, the applicable radio network device grants a QoS class to the application, and the radio network will honor the granted QoS level for the duration of application session (IP flow(s)). A need exists for technologies that will give a wireless network operator greater control over the granted QoS and will allow the operator to modify or change granted level or class of QoS.

SUMMARY

The teachings herein address the above noted need for greater control over QoS in a wireless packet network by implementing a QoS policy look up functionality. The policy-based QoS functionality allows the operator to modify or change QoS in real time, from the level of QoS that normally would be granted to a particular packet flow, based on operator configured policies, triggers and/or actions.

For example, the detailed description below discloses examples of a method of controlling quality of service (QoS) provided for a packet flow through a carrier's code division multiple access (CDMA) wireless communication network for a mobile station. The packet flow has been established through the CDMA wireless communication network, at a first QoS level. The method involves using one or more parameters of the packet flow to look up a second QoS level for application to the packet flow, in a table of the carrier's QoS policies. If the second QoS level differs from the first QoS level, an element of the CDMA wireless communication network controlling wireless packet service for the mobile station is instructed to process packets of the flow in accord with the second QoS level.

Such a method, for example, may be implemented in an appropriately configured or programmed packet data serving node PDSN. The PDSN will store or have access to the QoS look up table.

A number of different conditions may be used to trigger the policy look up and attendant setting of operations to the configuration supporting the second level of QoS. For example, the policy look up may be responsive to a request for a QoS level of service for the mobile station, following establishment of a session through the CDMA wireless communication network at the first QoS level, e.g. in response to a QoS request from the station itself or in response to a grant of the second level of QoS to another mobile station in communication with the first station, e.g. so both have the same QoS to support a particular application. As another example, the policy look up may be periodic. Examples are also discussed in which the policy look up may be responsive to a network operations command, e.g. from operations personnel or an operations center.

In some cases, the policy look up and attendant real time change in QoS level relates to a single packet flow, e.g. for one mobile station. However, the look up and QoS change may effect flows for any number of mobile stations, e.g. in response to an operations command relating to an emergency.

In some instances, the second QoS level is a higher QoS level than the first QoS level. Situations also arise where it is desirable to bump the QoS level down, e.g. to free capacity for other emergency related services, in which case the second QoS level is a lower QoS level than the first QoS level.

A variety of different flow related parameters may be used in the policy look up, to determine the applicable QoS policy. For example, the Source IP address, Destination IP address, Subnet mask, IPv6 address prefix, IPv6 Interface ID, Protocol Type, Source port number, Destination port number, domain name, realm name, user name, server name, or any other field in the datagram header or the user data could be used to identify a user associated with the mobile station or a group of users of which the mobile station user is a member or to identify a communication application utilizing the associated packet flow.

From a somewhat different perspective, the detailed description also discloses examples of a method of providing a wireless packet communication service for a mobile station, which includes a step of establishing, at a first QoS level, a packet flow through a CDMA wireless communication network for the wireless packet communication service for the mobile station. In response to a triggering condition, one or more parameters of the packet flow are used to look up a second QoS level to apply to the packet flow, in a table of QoS policies. The method also involves modifying operations of the CDMA wireless communication network with regard to processing of wireless packet service for the mobile station, to process packets of the flow in accordance with the second QoS level, in the event that the second QoS level differs from the first QoS level.

The detailed description below also discusses a system for controlling quality of service (QoS) provided for a packet flow for communication of a mobile station. This system includes a packet data serving node (PDSN) for providing a packet interface between a radio access network providing CDMA wireless communication for the mobile station and a packet data communication network. The control system also includes a QoS policy table, accessible by the PDSN, containing a plurality of QoS policies. After the packet flow has been established through the radio access network and the PDSN, at a first QoS level, the PDSN may (e.g. in response to a trigger condition) use one or more parameters of the packet flow to look up a second QoS level to apply to the packet flow, in the QoS table. If the second QoS level differs from the first QoS level, the PDSN instructs an element of the radio access network controlling wireless packet service for the mobile station to process packets of the flow in accord with the second QoS level.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

As shown in the examples discussed below, a policy based look up procedure enables a wireless network operator to modify or change granted quality of service (QoS) of an application packet flow in real time, e.g. in response to a customer service request, upon a determination of a need to change network operations, or under other dynamic circumstances. The policy look up table contains QoS policies (specifying applicable levels of QoS) as well as rules to identify an individual or group of users and the associated packet flows. In IP packet flows, for example, the Source IP address, Destination IP address, Subnet mask, IPv6 address prefix, IPv6 Interface ID, Protocol Type, Source port number, Destination port number, domain name, realm name, user name, server name, or any other field in the datagram header or the user data could be used to identify user or group of users and the associated IP flows for purposes of identifying the appropriate QoS policy.

In addition to policies and rules to uniquely identify a user, group or associated application for each of the flows, the policy look up table contains a rule set to specify either an application type method or user profile method or both to be used as a trigger to modify QoS. The policy lookup table will reside on or be accessible by a device having knowledge of user sessions and their associated application flows. If the QoS that the network would normally have granted to an application flow is different from the criteria defined in the policy look up table, the device informs one or more radio network elements to modify or change the granted QoS. The proposed invention can be used to modify the granted QoS either using an application type or user profiler methods. In both methods a single or multiple user application flow QoS can be modified.

Figure 1:
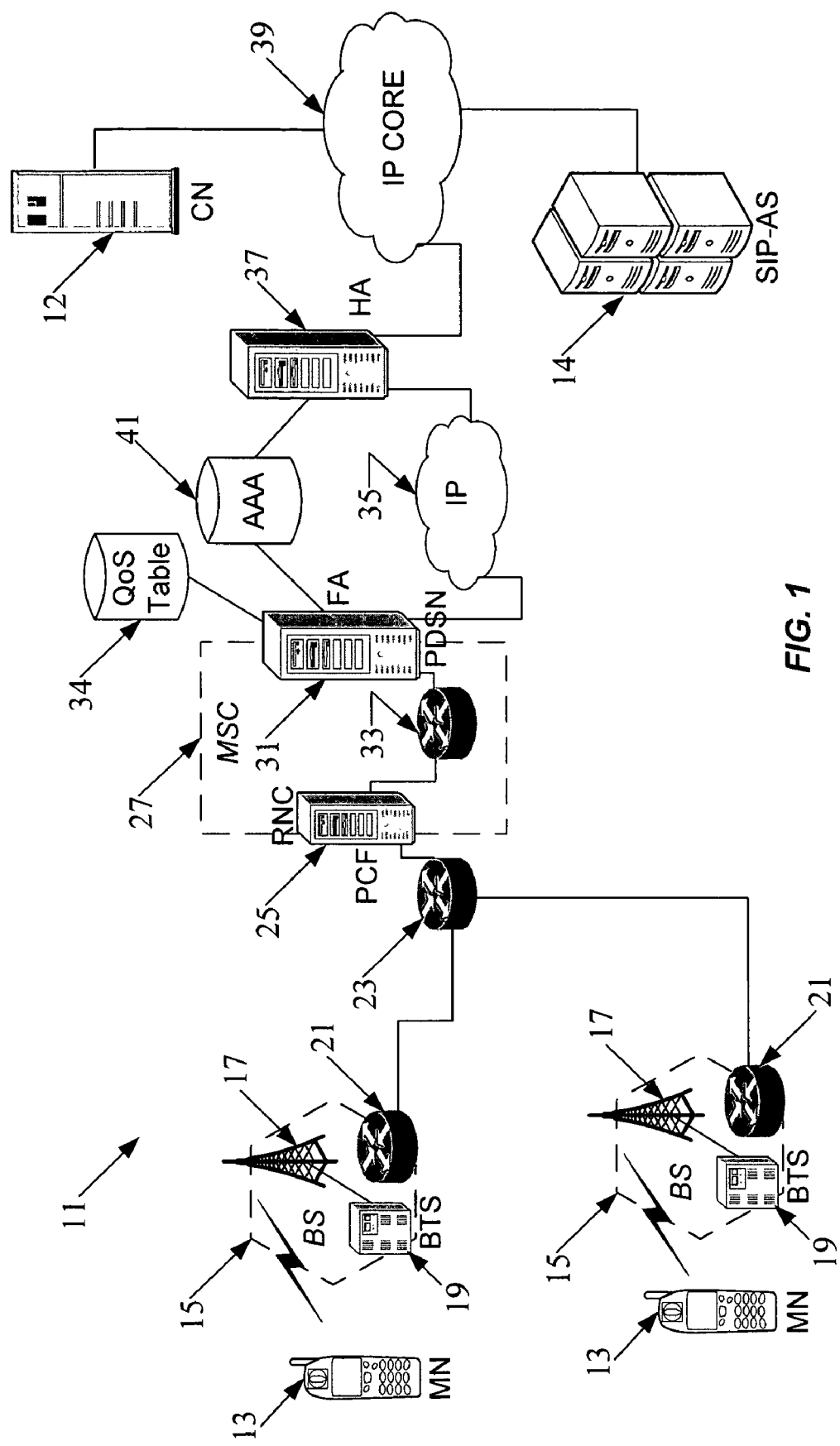
FIG. 1 is a high-level functional block diagram of a network providing wireless packet data communication services, which may have a QoS policy look up functionality to vary QoS in real time from that normally granted by the network.

With that overview, it may be helpful next to consider the exemplary system illustrated in FIG. 1, in somewhat more detail. FIG. 1 depicts a 3GPP2 1xEV-DO network architecture. The functional block diagram shows elements of an exemplary code division multiple access (CDMA) wireless mobile communication network 11, for providing packet based services, for multimedia data applications such as mobile voice telephone services based on VoIP type packet communications. The drawing shows network elements in high-level functional block diagram form.

The communication network 11 provides packet communication services for numerous mobile stations, although for discussion purposes, the drawing shows two such devices 13. A mobile device 13, sometimes referred to as a mobile node (MN), typically runs one or more "client" programs for implementing the agent functionality with respect to one or more communication services that the user obtains or subscribes to through the network 11. The mobile device 13, for example, may take the form of a mobile telephone station, with display and user input capabilities to support multimedia communications. Today, such mobile telephones implementations of the device 13 typically take the form of portable handsets, although they may be implemented in other form factors. As another class of station examples, the mobile device 13 may take the form of a personal digital assistant (PDA) or a portable personal computer (PC), incorporating a wireless transceiver compatible with the particular type of wireless packet data service offered by the network 11. Of course, the mobile stations may take other forms or connect to a variety of other data devices that may enable use of the network communication services.

The mobile node (MN) 13 sends and receives packets to and/or from a Corresponding Node (CN) 12 via the network 11. The CN 12 may be any device on the network 11 or the Internet or a private Intranet, such as a server, another mobile device, a terminal, etc. The Session Initiation Protocol (SIP) application server (AS) 14 is an example of one specific type of CN node, which may be involved in Voice over Internet Protocol (VoIP) type communications to/from mobile stations 13.

The network 11 includes or implements one or more radio access networks (RANs), for wireless communications with the mobile devices receiving service via the network 11. Physical elements of a radio access network include a number of base stations (BSs) 15. Each base station 15 includes an antenna system 17 and a CDMA type base transceiver system (BTS) 19 for CDMA type wireless communications over the air with mobile stations 13. One or more routers 21, 23 provide packet routing to and from the BTS 19 and a radio network controller (RNC) 25 at a mobile switching center (MSC) 27.

The base transceiver system (BTS) 19 communicates via the antenna system 17 and the air-link with one or more of the mobile stations 13, when the mobile stations are within range. The BTS 19 is the part of the radio network that sends and receives CDMA radio frequency signals carrying packets to/from the mobile stations 13 that the base station 15 currently serves. The RNC functionality controls the operations of a number of base stations 15 and helps to manage how calls made by each mobile station 13 are transferred (or "handed-off") from one serving base station 15 to another.

The routers 21 and 23 generically represent a network segment connecting the BTS 19 to the RNC 25, located in the Mobile Switching Center (MSC) 27.

The RNC 25 implements a packet control function (PCF) for converting communications in the radio protocols into packet protocols, to allow routing of packets through higher level elements of the network 11 in standard packet protocol formats. The PCF may provide buffering of packets, if available resources allocated to a mobile station 13 are temporarily overloaded by a packet flow. Although shown as an element/function of the RNC node, the PCF function may be a stand-alone packet switching node, it may be incorporated in the router/switch or other node that performs the BSC function, or the PCF function may be incorporated into a PDSN.

The network 11 also includes a number of Packet Data Serving Nodes or "PDSNs." The PDSN essentially is the point of interface between the radio access network and the packet network elements. In the MSC 27 serving the mobile device 13, the PDSN 31 serves as a foreign agent (FA). The PDSN is in packet communications with the RNC 25, e.g. via another router 33. The foreign agent PDSN 31 establishes, maintains and terminates logical links to the associated portion of the radio access network. The PDSN also supports point to point protocol (PPP) sessions with the mobile stations 13. The PDSN provides the packet routing function from the radio network to/from other packet switched networks, in this case via the IP network 35 to a home agent (HA) 37, which in turn provides packet routing to/from an IP core network 39, e.g. for Internet or Intranet access.

The agents 31 and 37 are coupled to an Authentication, Authorization, and Accounting (AAA) system 41. At one or more points in the processing of a call or other communication session, the PDSN FA 31 or the HA 37 accesses the AAA server 41 to obtain call access authorization, and the FA and HA provide information regarding the duration/volume of use during the session, to the AAA server for accounting purposes.

The IP core portion 39 of the network 11 may be implemented in a variety of different ways, which will provide adequate transport capability for the IP packet traffic. For purposes of discussing a complete example, the core 39 might utilize Multi Protocol Label Switching (MPLS) for fast efficient forwarding of packets over asynchronous transfer mode (ATM) cell type transport. Those skilled in the art will recognize that various networks may utilize these or other combinations of communications protocols. The IP core 39 provides IP packet transport to other packet networks (not shown) such as the public Internet and various private intranets.

For purposes of real-time QoS control, the PDSN 31 has stored therein or has other access to a table or database 34 containing QoS policy information, which the PDSN 31 uses to control and/or modify established QoS for packet flows to/from mobile stations 13. Those skilled in the art will recognize that the policy table and attendant policy look up and control function may be implemented at other network nodes, such as the RNC 25.

In the illustrated example, a look up to determine an applicable QoS policy, e.g. in response to a trigger condition, enables the PDSN 31 to modify or change the level of QoS granted to a particular application packet flow, typically from that granted to the application packet flow at session initiation, in real time. The trigger condition may be a specific event, such as a request for QoS from an application on or attempting communication with the mobile station, or a network operations command on behalf of the carrier operating the network (e.g. in an emergency). In other situations, the look up may be triggered in response to elapsed time, e.g. at predetermined intervals (passage of time is the trigger condition). In this way, the PDSN 31 can initiate a policy look up in the table 34 with respect to one or more packet flows, for example, in response to a customer service request, upon a determination of a need to change network operations, or under other dynamic circumstances.

The QoS policy look up table 34 contains policies setting QoS levels and rules to identify an individual or group of users and/or application types and to identify the associated packet flows to which to apply the QoS policies. In IP packet flows, for example, the Source IP address, Destination IP address, Subnet mask, IPv6 address prefix, IPv6 Interface ID, Protocol Type, Source port number, Destination port number, domain name, realm name, user name, server name, or any other field in the datagram header or the user data could be used to identify user or group of users and the associated IP flows for purposes of identifying the appropriate QoS policy. In addition to the QoS policies or levels and the rules to uniquely identify a user and associated application flows, the QoS policy look up table 34 contains a rule set to specify either an application type method or user profile method or both to be used as a trigger to modify QoS. If the QoS class that the network would normally have granted to an application flow is different from the class defined in the policy look up table 34, the device informs one or more radio network elements, typically the RNC 25, to modify or change the granted QoS. Single or multiple user application flow QoS can be modified.

Figure 2:
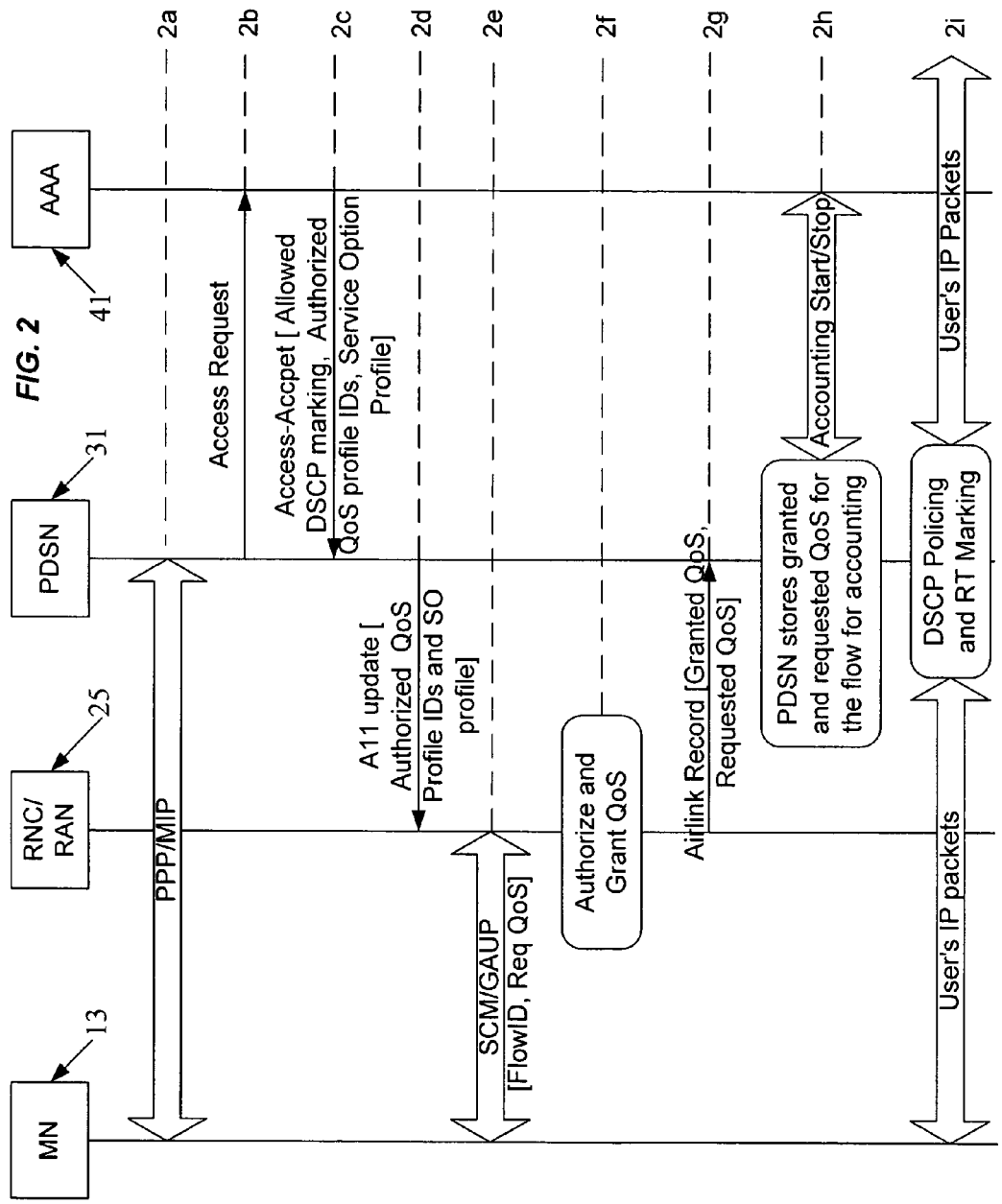
FIG. 2 is a signal flow diagram or 'call flow' illustrating an existing technique for establishing data communications through a wireless network with a grant of requested QoS.

To appreciate the enhancements provided by use of the look up in the QoS policy table 34, it may be helpful to consider some examples of network processing as represented by signal flows or 'call flows.' First, we will consider an example of a typical network procedure for simply granting and applying a QoS level to a user's IP packet application flow based on the user's subscription, without a QoS look up. Hence, FIG. 2 illustrates signaling by the mobile station or node MN 13, the RNC 25, the PDSN 31 and the AAA server 41 for a subscription based grant of QoS. Aspects of the communication that do not directly relate to the QoS granted to the packet flow through the radio access network are omitted from this figure (and from later call flows), for convenience, as such signaling and communication conforms to industry standards and should be well known to those skilled in the art.

In step 2a, the mobile station or node "MN" 13 initiates set-up of a PPP or Mobile IP (MIP) session extending through the network 11 to the PDSN 31. In step 2b, the PDSN 31 sends an Access-Request type signaling message to the AAA server 41; and at step 2c, the AAA server 41 returns the users QoS profile IDs and DSCP markings. The exemplary response message (at 2c) also includes the user's Service Option (SO), for the particular level of service to which each user subscribes.

Differentiated Services Code Point (DSCP) provides a translator marking that informs a network element such as the PDSN 31 or the RNC 25 what QoS treatment to apply to a packet flow. DSCP is typically used in IP packet routing elements, where the QoS treatment is applied based on information from IP packet headers. In the example of FIG. 1, DSCP typically is used for QoS control in wireline type packet routing elements in the network levels above (to the right in the drawing) the PDSN 31. Across the radio-packet interface, the PDSN may also use DSCP markings for QoS control of packets flowing to/from the packet routing elements in the higher network levels.

The packet format utilized in the radio access network may not strictly conform to IP, although it provides interworking for transport of IP packet flows to/from mobile stations 13. An allowed QoS profile ID defines a QoS treatment to apply to a packet flow, however, this ID is one adapted for use in processing cellular network packets (i.e. packets that may contain only portions of IP packets). In the example, the RNC 25 is the element that controls QoS in the radio access network (RAN), particularly over the air link to/from the mobile station node MN 13. The RNC 25 implements such control, based on QoS profile IDs received via or from the PDSN.

The radio access network (RAN) offers predefined Service Options for different types of calls, e.g. voice-grade telephone calls and various packet-switched data applications. The Service Options typically have associated sets of radio protocol parameters, which may be specified as the default parameters for the Service Option, to support each specific service application. In a common network arrangement, one such Service Option is Service Option 33 (for a 1X type network implementation) and Service Option 59 (for an EV-DO type network implementation), for packet-switched data communication services; and another such Service Option is Service Option 3 (SO3) for voice-grade (EVRC) circuit switched telephone calls. Of note for purposes of this discussion, newer mobile stations and network infrastructure also support other service options, such as SO67, which allows for two-way communication of packets over the air link, with the packet headers removed. In the exemplary call flow, the response message (at 2c) indicates the Service Option (SO) that the BTS 19 and the MN 15 are to use throughout the particular packet communication session.

In step 2d, the PDSN 31 forwards QoS profile ID and the Service Option (SO) profile to the RNC 25. The RNC 25 uses the information from the PDSN 31 to provide the requested service for the MN 13 with the level of QoS appropriate to the customer's subscription. In step 2e, the application at the MN 13 requests a QoS reservation from the RNC 25. In step 2f, based on resource availability and user's authorized limits, the RNC 25 grants the requested level of QoS to the flow to/from the application/MN 13. Although not separately shown, this may entail signaling to other elements of the RAN, e.g. to inform the BTS 19 associated with the BS 15 serving the particular MN 13 of the applicable Service Option (SO) for the QoS level corresponding to the allowed QoS profile ID.

In step 2g, the RNC 25 informs the PDSN 31 of the QoS level that was requested and granted for the flow. In step 2h, the PDSN 31 generates per flow a usage data record (UDR) with the granted QoS parameters and sends an accounting start message to the AAA server 41. In step 2i, IP packets flow through the system. The PDSN 31 performs DSCP policing at the interface to the higher level IP routing elements and reverse tunnel (RT) marking. The radio access network elements process the flow in accord with the QoS profile.

Figure 3:
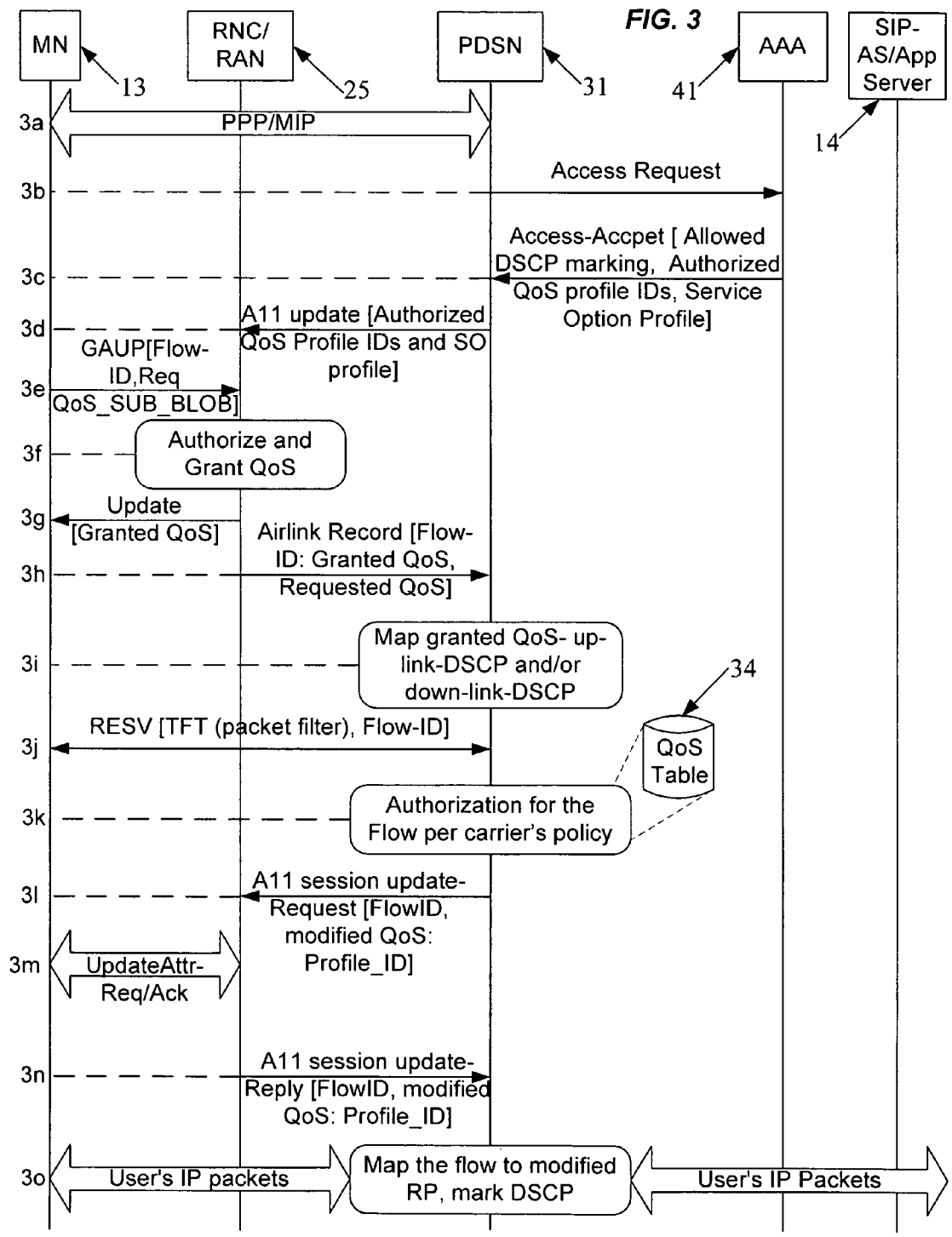
FIG. 3 is a signal flow diagram or 'call flow' illustrating a process of establishing data communications through a wireless network, with the level of QoS changed in real time based on a QoS policy look up.

FIG. 3 illustrates a similar call flow for establishing data communications through a wireless network, but with a QoS policy look up to provide the carrier with additional QoS related control. In step 3a, the MN 13 sets up the PPP or the MIP session over the main Service Connection through the radio access network to the PDSN 31. In step 3b, the PDSN 31 sends an Access-Request type signaling message to the AAA server 41; and at step 3c, the AAA server 41 authenticates and authorizes the user's packet flow service. The response message sent in step 3c includes the user's QoS profile IDs and DSCP markings. In step 3d, the PDSN 31 forwards the profile IDs and SO profile to the RNC 25.

In step 3e, the MN 13 initiates a QoS request for a flow triggered by an Application running at the MN 13 for which the user wants to communicate through the network 11. In step 3f, the RNC 25 grants the requested QoS, at this point in the process, based on the user's profile ID. In step 3g, the RNC 25 sends an acknowledgement of the granted QoS back to the MN 13.

In step 3h, The RNC 25 sets up an A10 connection with the PDSN 31 for the flow. In the example, the RNC 25 sends an Airlink Record type signaling message that includes a number of parameters, including the QoS granted in accord with profile ID. The PDSN 31 stores the granted QoS and related data [profile ID and the FlowID], and in step 3i, the PDSN 31 maps the up-link granted QoS profile ID to the up-link-DSCP, that is to say so that the QoS of the packet flow through the RAN to/from the MN 13 matches the QoS of the packet flow through the upstream packet network elements.

In step 3j, the MN 13 sends a flow-mapping reservation signal (RESV) with packet filter TFT (Traffic Flow Template) and FlowID. The station MN 13 may perform SIP negotiation prior to this stage, which is not shown here. The RESV signaling is just an example the way PDSN 31 can learn about the packet filters. There may be other ways for the PDSN to receive this information. Another way or approach is via an external network interface from a device that has knowledge of the packet filters associated with an application.

In step 3k, upon receiving the TFT with packet filters for the FlowID, the PDSN 31 accesses the QoS policy look up table 34. This look up uses one or more parameters relating to the packet flow for the user's communication session to determine the appropriate QoS level to apply, in accord with one of the carrier's QoS policies listed in the table 34. As outlined earlier, the policy look up table 34 contains policies and rules to identify an individual or group of users and the associated packet flows for use in applying the policies. In IP packet flows, for example, the Source IP address, Destination IP address, Subnet mask, IPv6 address prefix, IPv6 Interface ID, Protocol Type, Source port number, Destination port number, domain name, realm name, user name, server name, or any other field in the datagram header or the user data could be used to identify user or group of users and the associated IP flows for purposes of identifying the appropriate QoS policy. In addition, the policy look up table contains a rule set to specify either an application type method or user profile method or both to be used as a trigger to modify QoS.

Of course, the policies in the QoS table 34 also specify the QoS parameters (e.g. the QoS profile ID and/or the up-link-DSCP) for the appropriate class or level of QoS to be applied to identified flows and/or in response to identified trigger events. In some cases, the level of QoS identified by the policy table look up will correspond to the QoS level already granted to the established session for the mobile station MN 13. However, under some circumstances, the level of QoS identified by the policy table look up will differ from the QoS level already granted to the established session for the mobile station MN 13. The QoS level specified by the applicable policy may be higher or lower that the QoS level already granted to the established session.

If the QoS that the network granted to the user's application flow prior to the look up in step 3*i* is different from the QoS specified by the applicable policy, the PDSN 31 will take steps to instruct the RNC to modify or change the granted QoS. Since in our example, the QoS that the network granted to the user's application flow prior to the look up in step 3*i* is different from that defined in the policy look up table 34.

For purposes of this example, we will assume that the parameters of the user's packet flow do not meet specified policy requirements, defined in the policy look up table, for the level of QoS already granted. The QoS table indicates a lower level should apply. Hence, the PDSN 31 will take steps to inform the RNC 25 to modify or change the granted QoS. Since in our example, the packet flow does not meet specified policy requirements for the granted QoS, the PDSN 31 needs to send a modify or change message to the RNC 25. Hence, in step 3*l*, The PDSN 31 sends an A11 session update request message to the RNC. The session-update request message contains the FlowID and the modified QoS Profile ID. In step 3*m*, The RNC 25 modifies or changes QoS for the flow with the MN 13 (handset terminal), in accord with the new QoS Profile ID received from the PDSN 31, in this case to downgrade the level of QoS provided for the packet flow/session through the wireless part of the network 11.

The RNC 25 implements an Update Attribute communication with the MN 13 to implement the QoS change (at 3*m*). In example, the downgrade could be to best effort service, however, QoS can be downgraded to a level defined by a different profile ID. After the Update Attribute is complete with the MN 13 (step 3*m*), the RNC 25 sends a session update response back to the PDSN 31 with the modified QoS Profile ID for the flow (step 3*n*). This provides the change in QoS, in real time. In step 3*o*, IP packets flow through the system. Of note for purposes of this discussion, the RAN provides packet communications having a QoS level in accord with the modified Profile ID, and the PDSN maps the flow to the modified Radio-Packet (RP) interface with the appropriate DSCP marking for QoS through the upstream packet network elements.

In the above example, the processing downgraded the QoS for the flow from that granted based on the user's subscription (identified by the AAA). However, the above processing may also upgrade QoS. For example, if the user normally has only best efforts service, the carrier may offer a promotional service with higher QoS. For example, the carrier might want to promote a broadcast video-to-the-handset service. During the promotional period, if the user activated the video broadcast application in the mobile handset, the packet flow parameters would be sufficient to enable the PDSN to detect that fact (e.g. in response to the TFT in the RESV signaling received in step 3*j*). When the PDSN does the table look up as part of the processing in step 3*k*, the result would indicate a need to upgrade the QoS (from best efforts as would be granted at 3*f*) to that required and/or requested for the video service. The subsequent processing (3*l* to 3*n*) would then serve to bump the QoS for the user's video session up to the appropriate level by setting network parameters and/or by appropriate control signaling back to the mobile station 13.

Figure 4:
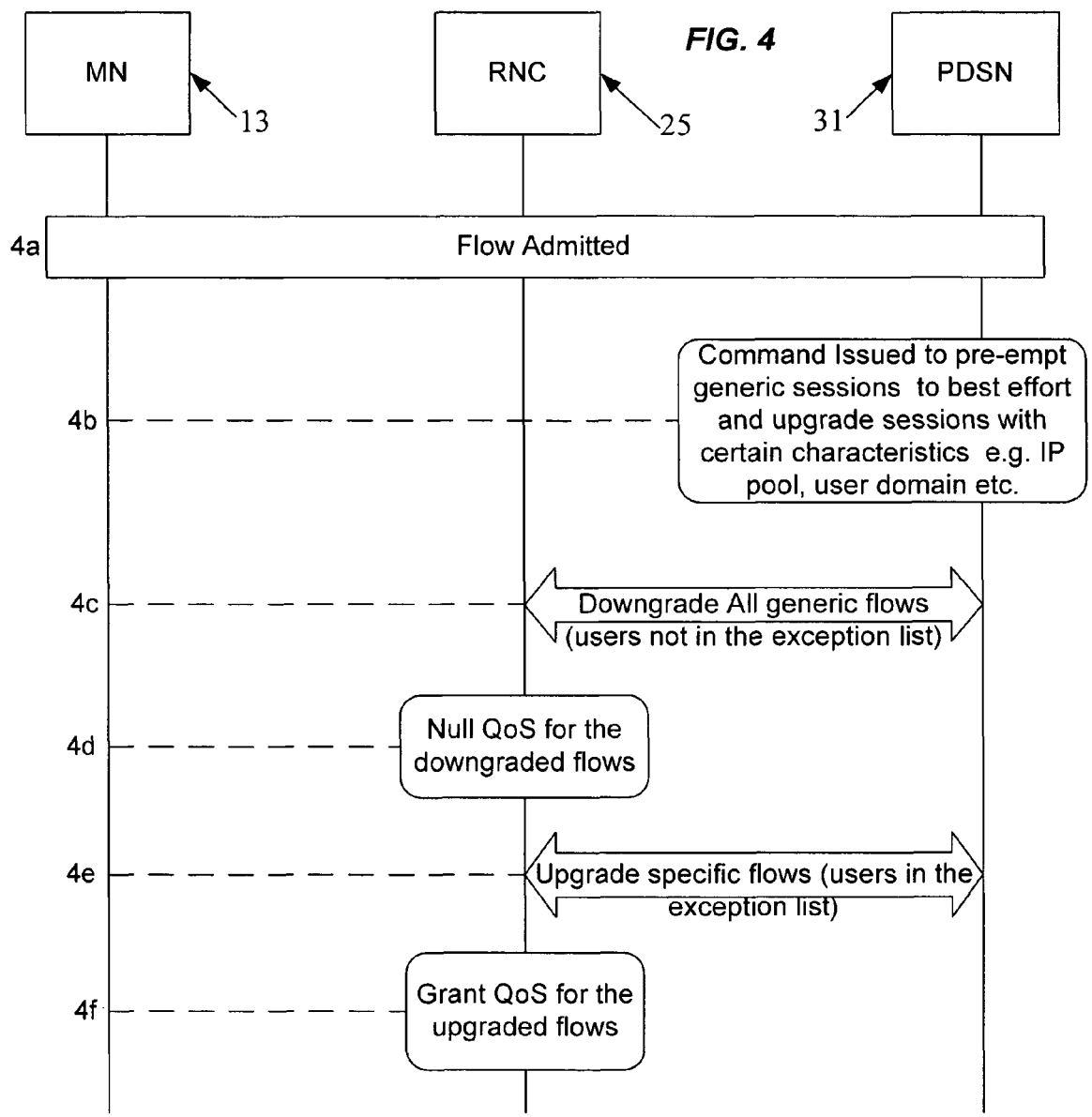
FIG. 4 is a signal flow diagram or 'call flow' for a data communication through a wireless network, with a mid-flow QoS modification.

In the example of FIG. 3, the PDSN changed the level of QoS from that ordinarily granted during session establishment, based on the applicable policy from the QoS policy table 34. The QoS policy table also provides a mechanism to change QoS level during an ongoing (previously established) session. The 'call flow' of FIG. 4 illustrates a signal flow for a process involving a mid-flow QoS modification.

In this example, one or more sessions are established and packet flow(s) admitted for one or more of the mobile stations MN 13 (step 4*a*), essentially as discussed above relative to FIG. 3. Based on the granted level of QoS, packet communications are conducted to and from the mobile station MN 13, via the RNC 25 and the PDSN 31. At any given time, a number of such sessions will be ongoing with non-premium service, that is to say best efforts delivery without QoS guarantees, while sessions for mobile stations of premium service subscribers will be ongoing with one or more levels of QoS guarantees.

Although not separately shown, the PDSN 31 may periodically check the established QoS mappings for ongoing flows against the policy look up table, in which case it will change the QoS assignments to various flows in response to one or more changes in the policy look up table. Alternatively, new policy mappings may be triggered in response to a specific command, typically from network operations personnel or equipment of a network operations center (not shown).

In the example, at step 4*b*, the PDSN 31 receives a command to pre-empt generic sessions to best effort service and upgrade sessions with certain characteristics, e.g. based on IP pool, user domain etc. Such a command, for example, might be issued in an emergency situation to guarantee QoS to stations of users expected to respond to the emergency and to free up capacity by reducing QoS for other users to best effort service.

In response to the received network operations command, the PDSN 31 will recheck the QoS for each existing packet flow, in a manner analogous to the look up processing at step 3*k* in the flow of FIG. 3. From these look-up operations, the PDSN 31 identifies appropriate flows for downgrading and at 4*c* executes the signaling with the RNC 25 to downgrade all generic flows (users not in an exception list corresponding to the current pre-emption command). In response, the RNC 25 will null the QoS parameters (e.g. QoS profile ID) for the flows that are to be downgraded (step 4*d*). The signaling with regard to service of each mobile station MN 13 to be set to best effort service (4*c* and 4*d* in FIG. 4) may be similar to that discussed above relative steps 3*l* to 3*o* in FIG. 3.

The PDSN 31 also will identify appropriate flows for upgrade (flows of users on the exception list) and the appropriate QoS level(s) for each of those flows. At step 4*e*, the PDSN 31 executes the signaling with the RNC 25 to upgrade the specific flows of the users on the exception list. In response, the RNC 25 will set new QoS parameters for those flows (e.g. to one or more new QoS profile IDs) for the flows that are to be upgraded (step 4*f*). The signaling with regard to service of each mobile station MN 13 that is upgraded (4*e* and 4*f*) may be similar to that discussed above relative steps 3*l* to 3*o* in FIG. 3.

Figure 5:
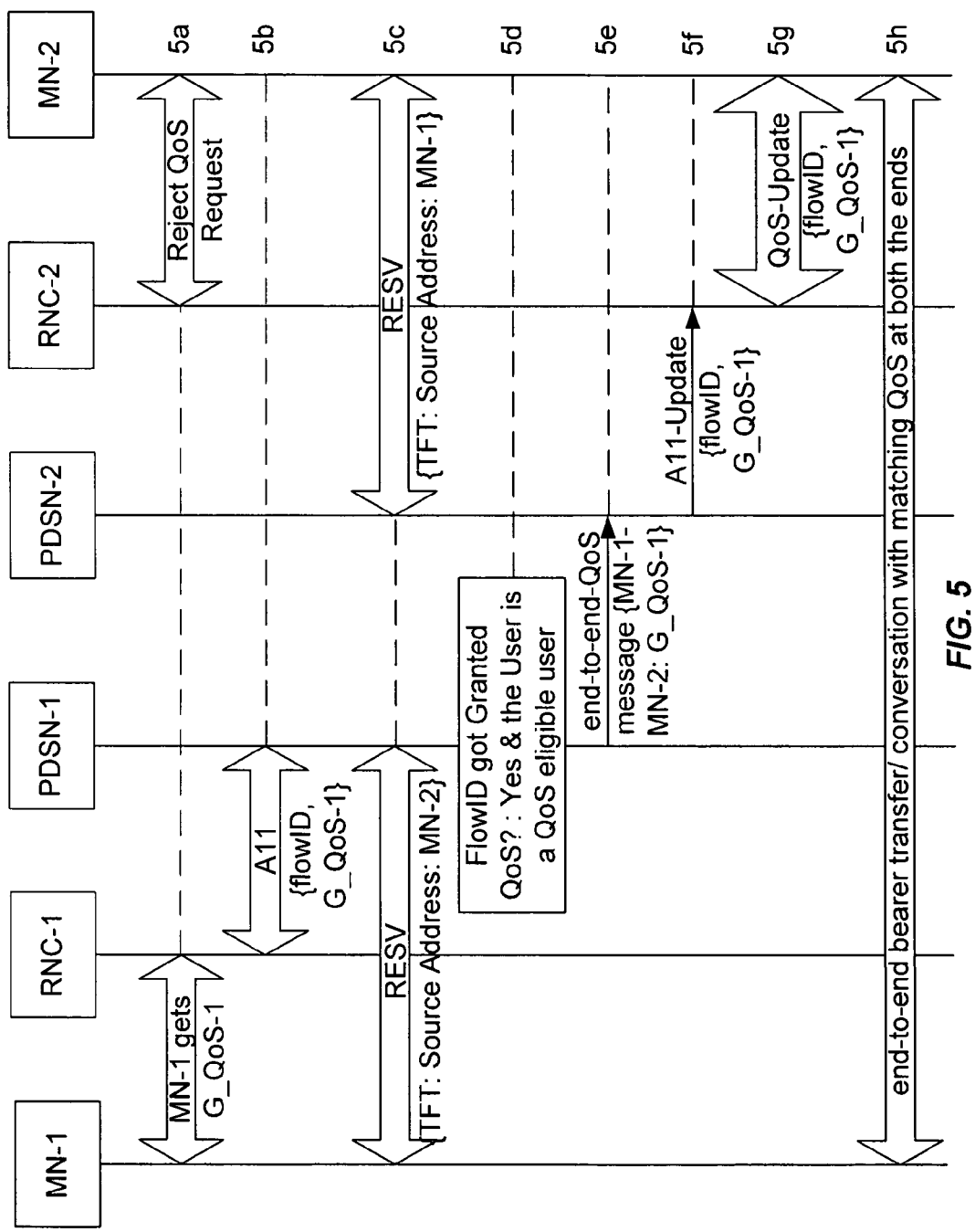
FIG. 5 is a signal flow diagram or 'call flow' showing an example of the process flow for communications between two mobile users.

FIG. 5 is a signal flow diagram or 'call flow' showing an example of the process flow for communications between two mobile users, having mobile stations or nodes, MN-1 and MN-2. For discussion purposes, the user of the first mobile node MN-1 is a QoS eligible user (premium), whereas the user of the second mobile node MN-2 is not QoS eligible (non premium user).

In step 5*a*, the user of the first mobile node MN-1 (premium user) initiates an application that requires QoS for a communication with the second mobile node MN-2. Hence, MN-1 sends a request for the network to provide the required level of QoS, to the RNC-1 that is currently serving MN-1. In this example, the RNC-1 grants the request level of QoS to the first mobile node MN-1. The application in the first mobile node MN-1 wants to converse (data/video/voice) with the second mobile node MN-2, but as noted above, in our example, the user of the second mobile node MN-2 is not QoS eligible (non premium user). Hence, the second mobile node MN-2 sends a request for the network to provide the required level of QoS, because the application requires that level of QoS, but the RNC-2 rejects the QoS request from the second mobile node MN-2 because it is not eligible for the premium QoS service. In step 5b, the RNC-1 conveys the granted QoS for the first mobile node MN-1 to the PDSN-2 that is currently serving MN-1.

In step 5c, the first mobile node MN-1 sends to the PDSN-1 a flow-mapping reservation signal (RESV) with packet filter TFT (Traffic Flow Template), FlowID, etc. The TFT enables the PDSN-1 to map the desired application flow to the appropriate service connection through the packet network elements behind that PDSN.

In the RESV signal with the TFT, the first mobile node MN-1 inserts the address of the second mobile node MN-2 as the source address of the incoming IP flow intended for transport downstream to the first mobile node MN-1. The second mobile node MN-2 does the same process i.e. sends a flow-mapping reservation signal (RESV) with packet filter TFT to PDSN-2 with MN-1's address as the source of the IP flow that may be transmitted through PDSN-2 and RNC-2 towards the second mobile node MN-2. The behavior of the second mobile node MN-2 is the default, i.e. even if a mobile station does not get required QoS from the RNC, it shall send the TFT to the PDSN based on the application specific policy of the operator.

In step 5d, the PDSN-1 verifies that the first mobile node MN-1 is QoS eligible and the flow being admitted is receiving QoS through the RNC-1 in accord with the reservation. With regard to the first mobile node MN-1, the flow to this point in the process may be implemented essentially as discussed above relative to FIG. 3, but on the assumption that the QoS requested for the application on the first mobile node MN-1 is initially permissible, both under the user's subscription (as authorized by a AAA server) and under the applicable QoS policy from the look up table accessed by the PDSN-1

In step 5e, the PDSN-1 sends an end-to-end-QoS request message towards the second mobile node MN-2 using the source address extracted from the TFT. The end-to-end QoS message may carry generic information elements that an IETF compliant router will understand. Conversely, it may only carry information elements that a specialized 3GPP2 node (e.g. PDSN and/or MN-2) will understand. Some of the examples of protocols that may be used for this end-to-end QoS message are: Reservation Protocol "RSVP" (IETF), Next Step in Signaling (NSIS), Network Transport Layer Protocol/Network Signaling Layer Protocol "NTLP/NSLP" (IETF), and PDSN to PDSN interface protocol (3GPP2). Of note for purposes of this discussion, this end-to-end QoS message includes the addresses of the two mobile nodes MN-1, MN-2 and data identifying the level of QoS that has been granted to the first mobile node MN-1.

In step 5f, the PDSN-2 intercepts the message that is destined towards the second mobile node MN-2. The PDSN-2 detects that the message is for setting up QoS (upgrade QoS) for the second mobile node MN-2. At this time, the PDSN-2 will apply a local policy to decide whether the QoS upgrade is allowed or not, that is to say based on a look up in its associated QoS policy table, similar to that applied at step 3k in response to the RESV signaling in the example of FIG. 3. In the example, the PDSN-2 looks up the appropriate FlowID to upgrade QoS based on the received information in the end-to-end QoS message received at step 5e and the TFT that was received at step 5c. If the requested QoS upgrade is permissible under the associated QoS policy table, then the PDSN-2 sends an All-Session-Update message with updated QoS information to the RNC-2.

In step 5g, the RNC-2 sends an appropriate over the air signal to inform the second mobile node MN-2 that the previously requested QoS for that particular application has been granted at this point. From the point of view of the second mobile node MN-2, the processing may be in a manner similar to that of FIG. 3, on the assumption that the change of service at 3k to 3n implemented an actual upgrade of QoS. In step 5h, at this point both the nodes MN-1 and MN-2 should have uniform QoS reservations (end-to-end consistent QoS) to transfer application data or converse on a video or audio call.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3rd Generation Partnership 2 (3GPP2) wireless IP network standard
Authentication, Authorization, and Accounting (AAA)
Asynchronous Transfer Mode (ATM)
Base Station (BS)
Base Station Controller (BSC)
Base Transceiver System (BTS)
Corresponding Node (CN)
Code Division Multiple Access (CDMA)
Differentiated Services Code Point (DSCP)
Evolution, Data Only (EV-DO)
Foreign Agent (FA)
Home Agent (HA)
Identifier (ID)
Internet Engineering Task Force (IETF)
Internet Protocol (IP)
Internet Protocol version 6 (IP v6)
Mobile Node (MN)
Mobile Internet Protocol (MIP)
Mobile Switching Center (MSC)
Multi Protocol Label Switching (MPLS)
Network Signaling Layer Protocol (NSLP)
Network Transport Layer Protocol (NTLP)
Next Step in Signaling (NSIS)
Packet Control Function (PCF)
Packet Data Serving Node (PDSN)
Personal Computer (PC)
Personal Digital Assistant (PDA)
Point to Point Protocol (PPP)
Quality of Service (QoS)
Radio Access Network (RAN)
Radio Network Controller (RNC)
Radio-Packet (RP)

Reservation (RESV)
Reservation Protocol (RSVP)
Reverse Tunnel (RT)
Service Option (SO)
Time Division Multiple Access (TDMA)
Session Initiation Protocol (SIP)
Traffic Flow Template (TFT)
Usage Data Record (UDR)
Voice over Internet Protocol (VoIP)

What is claimed is:

1. A system for controlling quality of service (QoS) provided for a packet flow for communication of a mobile station, comprising:
 a packet data serving node (PDSN) for providing a packet interface between a radio access network providing wireless communication for the mobile station and a packet data communication network; and
 a QoS policy table, accessible by the PDSN, containing a plurality of QoS policies for respective predefined possible classes of QoS available for packet communication through the system and the radio access network,
 each policy for a respective predefined class of QoS having one or more QoS parameters defining a corresponding level of service for packet communications through the system and the radio access network;
 wherein after the packet flow has been established through the radio access network and the PDSN for wireless packet communication service for the mobile station, at a granted first predefined class of QoS, the PDSN is configured to perform functions comprising:
 (a) during processing of the established packet flow through the wireless communication network for the wireless packet communication service for the mobile station in accord with one or more parameters of the policy for the granted first predefined class of QoS to provide the level of service corresponding to the granted first predefined class of QoS in the processing of the established packet flow through the wireless communication network, detecting a triggering condition relative to the established packet flow through the radio access network and the PDSN for the wireless packet communication service for the mobile station;
 (b) responsive to the detection of said triggering condition, using one or more parameters of the established packet flow to identify a QoS policy for a second predefined class of QoS to grant to the packet flow, from among the plurality of possible predefined classes of QoS available for packet communications through the radio access network and the PDSN, in the QoS policy table, for application to processing of the established packet flow; and
 (c) upon the granted second predefined class of QoS differing from the granted first predefined class of QoS, instructing an element of the radio access network controlling wireless packet service for the mobile station to modify an operation with regard to processing of the established packet flow for the mobile station, to process packets of the flow in accord with the one or more parameters of the QoS policy for the granted second predefined class of QoS to provide the level of service corresponding to the granted second predefined class of QoS in the further processing of the established packet flow through the system and the radio access network.

2. The system of claim 1, further comprising the radio access network.

3. The system of claim 2, wherein the radio access network is a code division multiple access (CDMA) network.

4. The system of claim 1, wherein the triggering condition comprises receipt of a request for a class of QoS for the mobile station, following the establishment of the packet flow through the radio access network at the granted first predefined class of QoS.

5. The system of claim 1, wherein the triggering condition comprises passage of a time period.

6. The system of claim 1, wherein the triggering condition comprises receipt of a network operations command.

7. The system of claim 6, wherein the PDSN is configured to perform the further function comprising modifying operations of the radio access network, with regard to packet flows through the network for a plurality of additional mobile stations, in response to the receipt of the network operations command.

8. The system of claim 1, wherein the granted second predefined class of QoS is a higher class of QoS than the first class of QoS.

9. The system of claim 1, wherein the granted second predefined class of QoS is a lower class of QoS than the first class of QoS.

10. The system of claim 1, wherein the one or more parameters of the packet flow used to identify the QoS policy for the granted second predefined class of QoS comprise one or more values from fields of a packet of the flow selected from the group consisting of: Source IP address, Destination IP address, Subnet mask, IPv6 address prefix, IPv6 Interface ID and Protocol Type.

11. The system of claim 1, wherein the one or more parameters of the packet flow used to identify the QoS policy for the granted second predefined class of QoS comprise one or more values from fields of a packet of the flow selected from the group consisting of: Source port number and Destination port number.

12. The system of claim 1, wherein the one or more parameters of the packet flow used to identify the QoS policy for the granted second predefined class of QoS comprise one or more values from fields of a packet of the flow selected from the group consisting of: domain name, realm name, user name, and server name.

13. The system of claim 1, wherein the one or more parameters of the packet flow used to identify the QoS policy for the granted second predefined class of QoS identify a user associated with the mobile station or a group of which the user is a member.

14. The system of claim 1, wherein the one or more parameters of the packet flow used to identify the QoS policy for the granted second predefined class of QoS identify an application communicating via the packet flow.

* * * * *